March 27, 1951 R. F. DARLING 2,546,432
APPARATUS FOR DEFLECTING A FUEL JET TOWARDS A REGION
OF TURBULENCE IN A PROPULSIVE GASEOUS STREAM
Filed Nov. 8, 1945 2 Sheets-Sheet 1
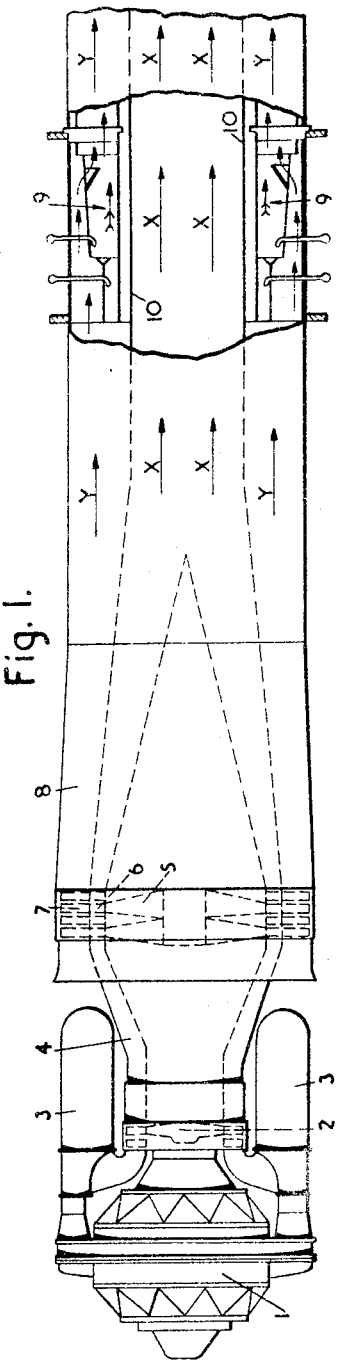
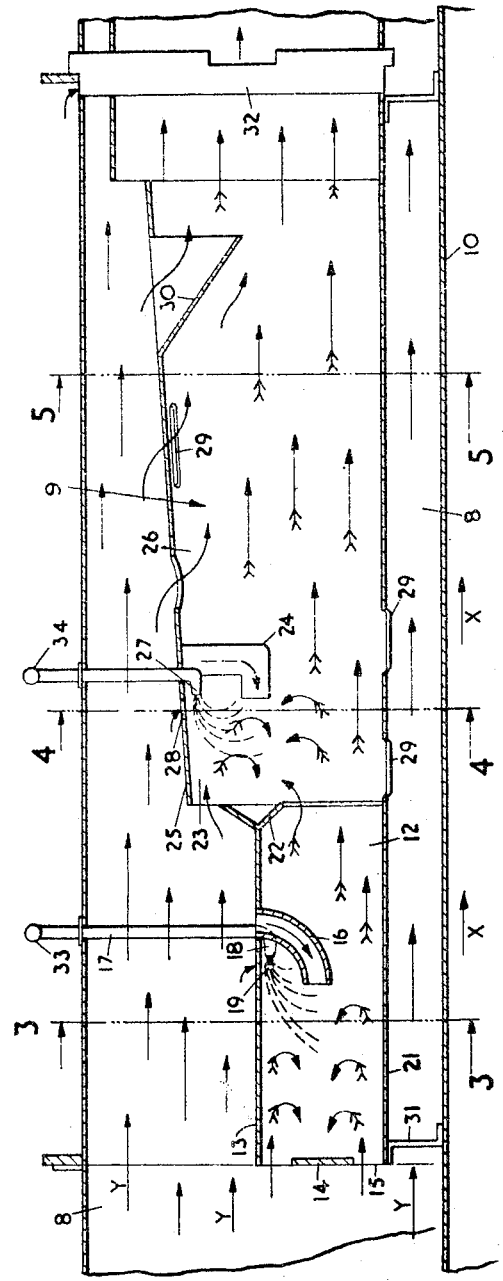
Inventor
Robert Francis Darling
By
Stevens and Davis
his Attorneys Patented Mar. 27, 1951

2,546,432

UNITED STATES PATENT OFFICE 2,546,432

APPARATUS FOR DEFLECTING A FUEL JET TOWARDS A REGION OF TURBULENCE IN A PROPULSIVE GASEOUS STREAM

Robert Francis Darling, Leicester, England, assignor to Power Jets (Research & Development) Limited, London, England Application November 8, 1945, Serial No. 627,388
In Great Britain March 20, 1944

24 Claims. (Cl. 60—41)

This invention relates to combustion apparatus, for the burning of fluid fuel in circumstances where complete combustion over a wide range of air/fuel ratio is required, and where the pressure loss due to mixing and combustion is to be kept to a minimum although the volumetric space available is restricted. Such a case (and it is primarily to meet the requirements of this case that the invention is conceived) is that in which it is required to burn liquid fuel in an air stream which has been generated for the purposes of aircraft propulsion, in a duct which forms part of a jet propulsion or ducted fan system. In a particular example to which the invention is proposed to be applied, and which is included in the invention, there is in an aircraft propulsion system, a gas turbine prime mover which by its propulsive exhaust drives an augmentor turbine which in turn drives an axial-flow compressor, the air energised by this compressor forming a thrust-augmenting stream in an annular duct surrounding the exhaust stream from the prime mover. In the augmentor stream, downstream from its compressor, fuel is to be burnt to energise this stream further. In such a scheme, it is necessary for practical utility that this secondary combustion should occur with the least possible pressure loss, whilst it will be clear that consideration has also to be given, to space and weight.

The invention enables good combustion to be maintained even with simple "solid" (i. e. unatomised) spray nozzles although the conditions of air supply may vary considerably. The combustion chamber arrangements, whilst intended in the particular case above mentioned to be of generally annular form, may be of widely varying form such as (sectionally) rectangular, oval, triangular, segmental or cylindrical, preferably having a sharply stalled edge.

According to one feature, the invention provides a method of heating a gaseous stream wherein a region of turbulence is created in said stream, fuel is injected into said stream in the form of means such as one or more jets directed upstream, and one or more transverse gaseous currents are associated with said jet or jets to urge the fuel towards the said turbulent region. Thus the injected pencil or jet of fuel may start virtually parallel with and close to a wall of a combustion chamber, and a nearby port or opening in this wall, admitting air, diverts and to some extent breaks up the pencil whilst blowing the fuel into the region where it is required to concentrate its combustion.

By way of example, one form of embodiment of the invention is described hereinunder with reference to the accompanying drawings in which—

Fig. 1 is a general representation of a system in which the invention is intended to be applied;

Fig. 2 is an enlarged view in sectional elevation of one form of embodiment of the invention;

Figure 3:
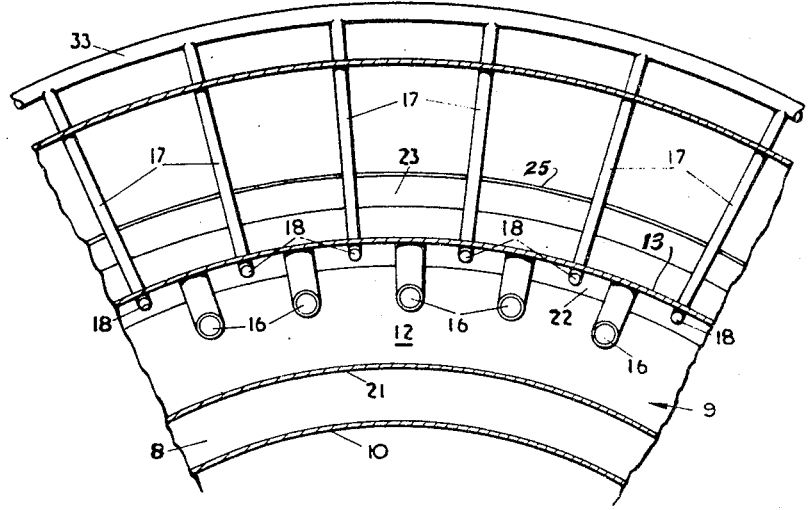
Fig. 3 is a section on the line 3—3 of Fig. 2.

Referring to the drawings, Fig. 1 shows the general arrangement of a propulsive system for aircraft to which the invention is intended to be applied. This system comprises a rotor 1 of a double air intake compressor driven by a turbine 2 mounted coaxially on the same shaft, the air drawn in by the compressor 1 being brought to combustion together with fuel in the compressor output which is delivered to the combustion chamber 3 in which combustion takes place. The hot gases are led from the chamber 3 through the turbine 2, thus driving it, are then passed through an annular duct 4 and are finally emitted in the direction of the arrows X through an outlet at the end of the jet pipe 10 forming in this way a main propulsive jet stream.

The propulsive system further comprises an augmenter system 5 comprising a further gas turbine element 6 which in turn drives a further compressor or ducted fan 7 which entrains new or secondary air through an annular duct 8. This air passes along the said duct 8 in the direction of the arrows Y and finally emerges from the apparatus being expelled together with the main jet stream X and thus augmenting the thrust produced.

Downstream from the augmenter 5 in the secondary air, secondary fuel is burned in the apparatus according to the invention denoted generally by reference numeral 9 arranged in the annular duct 8 to augment the thrust by raising the velocity of discharge.

The invention is concerned with the construction and arrangement of the apparatus 9 and an enlarged sectional view of this apparatus is shown diagrammatically in Fig. 2.

The annular air duct 8 encloses towards its upstream region an inner annular chamber 12 formed by coaxial cylindrical walls 13, 21, and the upstream end of this chamber 12 is partly closed by a baffle 14 which is of flat section and may have perforations or marginal gaps 15 (preferably equal on either side) to admit some air, This baffle 14 gives rise to a turbulent wake as shown by the barbed arrows into which more air is fed by means of bent pipes 16, known as ventilating tubes, fixed over holes cut in the wall 13. Within this primary combustion space 12, supplied with fuel by piping 17 from the outside is a ring series of burners 18. These burners project jets or sprays of fuel upstream (i. e. towards the baffle 14) and just clear of the wall 13 of the chamber 12. After leaving each burner 18 the fuel passes over a small hole or slot 19 in the wall 13, and air entering through this hole or slot 19 and impinging on the fuel jet breaks up the fuel into small droplets and deflects all or part of them into the turbulent wake formed by the baffle 14. In this chamber 12 combustion in rich mixture form with a high degree of turbulence, is maintained.

Fig. 3 shows the way in which the burners 18 are arranged to form a completely circular series. In the example illustrated a series of 36 such burners are used symmetrically disposed around the outer wall of the duct 8. The burners are supplied through a manifold 33.

Whilst the inner wall 21 of the chamber 12 extends far downstream, the outer wall 13 terminates at a comparatively short axial distance from the baffle 14 and its margin is provided with a V sectioned baffle 22 to promote further turbulence. This baffle 22 forms one lip of an annular opening 23 for the secondary air, the other lip of which is the upstream edge of an outer chamber wall 25, which wall 25 together with the extended inner wall 21 above mentioned forms a secondary combustion space 26. A secondary burner arrangement comprises a ring of burners 27 producing upstream jets directed close to the wall 25, and passing over holes or slots 28 in the wall 25 and being deflected into the turbulent region immediately downstream of the baffle 22 as in the primary case already described. A plurality of ventilating tubes 24 is also provided.

The whole combustion chamber above described lies inside the annular air duct 8 containing the airstream to be energized. The outer wall 25 of the secondary chamber 26 is preferably frustoconical (diverging downstream) in form as shown and its walls 21, 25, have slots 29, and scoops or mixers 30 distributed axially and circumferentially so as to entrain a substantial part of the air in the annular duct 8 whereby intimate mixing and heat exchange occurs between all the air and the immediate products of combustion.

Figures 4, 5:
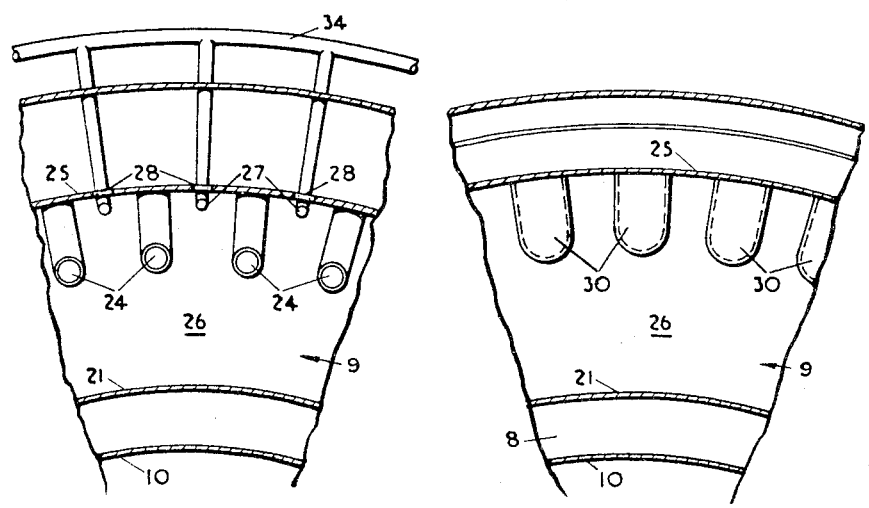
Fig. 4 is a section on the line 4—4 of Fig. 2.
Fig. 5 is a section on the line 5—5 of Fig. 2.

Fig. 4 shows the circular arrangement of burners 27. In the example illustrated 24 such burners are used and supplied by a manifold 34.

The general direction of the gaseous flow is shown by the arrows in Fig. 2, feathered arrows indicating hot air and unfeathered arrows cooler air.

I claim:

1. Combustion apparatus for a gaseous stream comprising means for creating a region of turbulence in said stream, means for injecting fuel in the form of at least one jet upstream into said stream and means for delivering at least one transverse gaseous current adapted to deflect the fuel from its normal path and toward said turbulent region.

2. Combustion apparatus for a gaseous stream comprising a combustion chamber through which said stream is directed, a plurality of turbulence-creating devices arranged in a successively downstream series, for each device a series of fuel injecting burners adapted to inject fuel in an upstream direction, and associated with at least some of said jets means for introducing at least one transverse gaseous current adapted to deflect the fuel from its normal path and towards the corresponding region of turbulence.

3. Combustion apparatus for a propulsive gaseous stream comprising at least one baffle adapted to create a region of turbulence in said stream, means for injecting fuel in the form of at least one jet upstream into said stream and means for delivering at least one transverse gaseous current to deflect the fuel from its normal path and toward said turbulent region.

4. Combustion apparatus for a propulsive gaseous stream comprising at least one combustion chamber through which said stream is directed, a plurality of baffles each adapted to create a region of turbulence in said stream and arranged in a successively downstream series, for each baffle a series of fuel injecting burners adapted to inject fuel in an upstream direction, and associated with at least some of said jets means adapted to introduce at least one transverse gaseous current adapted to urge the fuel towards the corresponding region of turbulence.

5. Combustion apparatus for a propulsive gaseous stream comprising a combustion chamber through which said stream is directed, a plurality of baffles each adapted to create a region of turbulence in said stream and arranged in a successively downstream series, at least one of said regions being disposed in a primary combustion space in said chamber from which the products pass downstream to a secondary combustion space formed in a second part of the chamber having an increased sectional area in which at least one further region of turbulence is created, for each baffle a series of fuel injecting burners adapted to inject fuel in an upstream direction, and associated with at least some of said jets means adapted to introduce at least one transverse gaseous current adapted to urge the fuel towards the corresponding region of turbulence.

6. Combustion apparatus according to claim 5 wherein further gas is admitted downstream of said second part of the chamber.

7. Combustion apparatus according to claim 5 wherein downstream of said second part of the chamber further gas is admitted in conjunction with a further fuel supply and turbulence creating means.

8. Combustion apparatus according to claim 5 wherein at least one wall of the primary combustion space is provided towards its edge with a V section lip which forms one lip of an annular opening for said secondary combustion space.

9. Combustion apparatus for a propulsive duct comprising means for delivering a gaseous stream through said duct, means for creating a region of turbulence in said stream, means for injecting fuel in the form of at least one jet upstream into said stream and means for delivering at least one transverse gaseous current adapted to operate on said jet to urge the fuel towards said turbulent region.

10. A propulsive system comprising an air compressor, means for burning fuel in the output air from said compressor, a first turbine driving said compressor and driven by the gases of combustion, an augmentor turbine and an axial flow compressor, said augmentor turbine being driven by at least part of the propulsive exhaust of said first turbine and itself driving said axial flow compressor, a duct for the passage of the exhaust stream from said first turbine, an annular duct surrounding said duct for the passage of the air-stream delivered by said axial flow compressor, and in said annular duct, combustion apparatus comprising means for injecting fuel in the form of at least one jet directed upstream into said air stream, means for creating a region of turbulence in said air stream, and means for delivering at least one transverse current of air adapted to operate on said jet to urge the fuel towards said turbulent region.

11. Combustion apparatus for a propulsive gaseous stream comprising means for creating a region of turbulence in said stream, means for injecting liquid fuel in the form of at least one jet upstream into said stream and means adapted to deflect the liquid fuel jet from its normal path and towards said turbulent region.

12. Combustion apparatus for a propulsive gaseous stream comprising means for creating a region of turbulence in said stream, means for injecting fuel in the form of at least one jet upstream into said stream and means for delivering at least one gaseous current adapted to deflect said jet from its normal path and towards said turbulent region.

13. A propulsive system comprising an air compressor, means for burning fuel in the output air from said compressor, a first turbine driving said compressor and driven by gases of combustion, an augmentor turbine and an axial flow compressor, said augmentor turbine being driven by at least part of the propulsive exhaust of said first turbine, and itself driving said axial flow compressor, a duct for the passage of the exhaust stream from said first turbine, an annular duct surrounding said duct for the passage of the air stream delivered by said axial flow compressor, and in said annular duct, combustion apparatus comprising means for injecting fuel in the form of at least one jet directed upstream into said air stream, means for creating a region of turbulence in said stream, and means adapted to operate on said jet to urge the fuel towards said turbulent region.

14. Combustion apparatus for a propulsive gaseous stream comprising at least one flat baffle disposed transverse to said stream and adapted to create a region of turbulence in said stream, means for injecting fuel in the form of at least one jet upstream into said stream and means for delivering at least one transverse gaseous current adapted to operate on said jet to urge the fuel towards said turbulent region.

15. Combustion apparatus for a propulsive gaseous stream comprising at least one flat baffle adapted to create a region of turbulence in said stream, said baffle being disposed transversely to said stream and symmetrically located to define gaps of equal width between the edge of said baffle and the adjacent wall of said apparatus, means for injecting fuel in the form of at least one jet upstream into said stream and means for delivering at least one transverse gaseous current adapted to operate on said jet to urge the fuel towards said turbulent region.

16. Combustion apparatus for a propulsive gaseous stream, comprising at least one baffle having a sharply stalled edge and adapted to create a region of turbulence in said stream, means for injecting fuel in the form of at least one jet upstream into said stream and means for delivering at least one transverse gaseous current adapted to deflect the fuel from its normal path towards said turbulent region.

17. Combustion apparatus for a propulsive gaseous stream, comprising at least one baffle adapted to create a region of turbulence in said stream, means for injecting fuel in the form of at least one jet upstream into said stream, and for at least some of the jets at least one entry for the admission of gas located upstream of and in proximity to the means for injecting said jet, said gas being in the form of a transverse gaseous current adapted to operate said jet to urge the fuel towards said turbulent region.

18. Combustion apparatus for a propulsive gaseous stream comprising an annular air duct forming an outer chamber, a pair of coaxial walls arranged within said outer chamber and forming at least one inner chamber, at least one baffle within said inner chamber to create a region of turbulence in said stream, means for injecting fuel in the form of at least one jet upstream into said stream, means for delivering at least one transverse gaseous current adapted to operate on said jet to urge the fuel towards said turbulent region, and at least one ventilating tube providing connection between said outer and said inner chamber.

19. Combustion apparatus for a propulsive gaseous stream comprising an annular air duct forming an outer chamber, a pair of coaxial walls arranged within said outer chamber and forming at least one inner chamber, at least one baffle within said inner chamber adapted to create a region of turbulence in said stream, means for injecting fuel in the form of at least one jet upstream into said stream, means for delivering at least one transverse gaseous current adapted to operate said jet to urge fuel towards said turbulent region, and means for promoting the admission and admixture of at least some of the gases in said outer chamber downstream of said baffle into and with the gases in said inner chamber.

20. Combustion apparatus for a propulsive gaseous stream comprising a combustion space in which said stream is brought to combustion, at least one baffle in said combustion space adapted to create a region of turbulence in said stream, means for injecting fuel in the form of at least one jet upstream into said stream, means for delivering at least one transverse gaseous current adapted to operate on said jet to urge the fuel towards said turbulent region, and means for bringing relatively cooler gases into association with said combustion space.

21. Combustion apparatus for a gaseous stream comprising a combustion chamber through which said stream is directed, a plurality of turbulence-creating devices arranged in a successively downstream series, for each device a series of fuel injecting burners adapted to inject fuel in an upstream direction, and associated with at least some of said jets means for introducing at least one transverse gaseous current adapted to deflect the fuel from its normal path and towards the corresponding region of turbulence, the upstream series of burners being adapted to operate at constant delivery while at least one of said downstream series of burners is adapted to have a variable delivery.

22. Combustion apparatus for a gaseous stream comprising a duct for carrying said stream, baffle means within said duct for creating a turbulent region in said stream, and means to inject a jet of fuel upstream within the duct, said duct having an entry for the admission of a gaseous current in a direction transverse to said jet to deflect at least some of the fuel in said jet towards said turbulent region.

23. Combustion apparatus according to claim 22 wherein within said duct is arranged a wall dividing said duct into two chambers, said baffle and said jet being in one of said chambers, and said wall having at least one entry for the admission of part of said gaseous stream from the other chamber to form said transverse gaseous current.

24. Combustion apparatus according to claim 23 wherein said baffle and said entry are both upstream of said fuel injecting means.

ROBERT FRANCIS DARLING.

REFERENCES CITED

The following references are of record in the file of this patent:

UNITED STATES PATENTS

| Number | Name | Date |
|---|---|---|
| 1,542,294 | Fogler | June 16, 1925 |
| 2,211,059 | Haas | Aug. 13, 1940 |
| 2,385,833 | Nahigyan | Oct. 2, 1945 |
| 2,395,403 | Goddard | Feb. 26, 1946 |
| 2,404,335 | Whittle | July 16, 1946 |
| 2,440,491 | Schwander | Apr. 27, 1948 |

FOREIGN PATENTS

| Number | Country | Date |
|---|---|---|
| 331,292 | France | July 24, 1903 |